United States Patent Office 3,540,876
Patented Nov. 17, 1970

3,540,876
NOVEL HERBICIDE MIXTURE
Jean Lhoste, Paris, France, assignor to Procida,
Marseille, France, a corporation of France
No Drawing. Continuation of abandoned application Ser.
No. 698,665, Jan. 17, 1968, which is a continuation of
abandoned application Ser. No. 471,756, July 13, 1965.
This application July 16, 1969, Ser. No. 849,548
Claims priority, application France, July 20, 1964,
982,301
Int. Cl. A01n 9/22, 9/24
U.S. Cl. 71—94                    7 Claims

ABSTRACT OF THE DISCLOSURE

Herbicidal compositions comprised of at least two phenoxyalkanoic acids or their alkali metal or amine salts and up to 5% by weight of 4-amino-3,5,6-trichloropicolinic acid, its salts or lower alkyl esters and a method of killing weeds in cereal crops.

PRIOR APPLICATION

The present application is a continuation of application Ser. No. 698,665, filed Jan 17, 1968 which is a continuation application of copending, commonly assigned U.S. patent application Ser. No. 471,756, filed July 13, 1965, both now abandoned.

PRIOR ART

Selective herbicides known for agricultural use are efficacious on one or several groups of related plants but no product is presently known which permits selective and simultaneous destruction of all families of wild plants. For the selective killing of weeds in cereals, 2,4-dichlorophenoxyacetic acid (2,4–D) or its salts are used to destroy Cirsium sp. (thistle), Papaver sp., etc., but these products have only a weak action on *Galium aparine* (bedstraw), *Stellaria media*, etc. 2-methyl-4-chlorophenoxyacetic acid (MCPA) or its salts are very active on *Sinapis arvensis* and *Thlaspi arvense*, but *Veronica persica*, *V. hederaefolia* and Polygonum sp. are not regularly controlled at the usual doses. 2-methyl-4-chlorophenoxypropionic acid (Mecoprop) or its salts are efficacious against Plantigo sp., Rumex sp., *Raphanus raphanistrum*, *Galium aparine* and *Stellaria media*, but their action is almost zero on Papaver sp. and Fumaria, sp. 2,4-dichlorophenoxypropionic acid (2,4–DP) is effective on *Galium aparine* and *Stellaria media* but is without action on *Chrysanthemum segetum* and *Lithospermum arvense*.

Since the various products above have somewhat different actions on the weeds in cultivated fields and most particularly of cultivated fields of cereal, their use in mixtures, while very desirable, does not permit the resolution of all of the problems which are posed in careful use for completely eliminating these weeds.

OBJECTS OF THE INVENTION

It is an object of the invention to provide novel synergistic herbicidal compositions.

It is another object of the invention to provide a novel method of killing weeds.

It is a further object of the invention to provide a novel method of selectively killing weeds in fields of cereal crops.

These and other objects and advantages of the invention will become obvious from the following detailed description.

THE INVENTION

The novel herbicidal compositions are comprised of at least two phenoxyalkanoic acid compounds selected from the group consisting of compounds of the formula

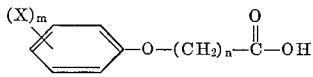

alkali metal and amine salts thereof, wherein X is at least one member of the group consisting of lower alkyl and halogen, $m$ and $n$ are integers from 1 to 3 and less than 5% of a compound selected from the group consisting of 4-amino-3,5,6-trichloropicolinic acid, lower alkyl esters thereof and salts thereof.

The said compositions have a synergistic activity on weeds as is evidenced by increased activity and attack of a broader group of weeds. The disadvantages of the phenoxyalkanoic acids which are synthetic auxins is pointed out above. 4-amino-3,5,6-trichloropicolinic acid (ATP) and its derivatives have a remarkable herbicidal activity on Matricaria sp., *Galium aparine*, Anthemis sp., Chrysanthemum sp., and *Polygonum aviculare* even at quite advanced stages of development and at very reduced doses. However, at the same doses its efficacy is weak particularly on *Fumaria officinales*, Papaver sp., *Veronica hederaefolia*, *Stellaria media*, *Sinapis arvensis* and *Viola tricolore*. The effect of this product on cereals prevents its utilization at doses greater than 60 gm./hectare to kill the latter weeds. Starting at this dose, symptoms of phytotoxicity begin to appear but in order to be effective, this product must be employed at a dose of 80 to 100 gm./hectare.

Examples of suitable phenoxyalkanoic acids which are useful in the herbicidal compositions of the invention are 2,4-dichlorophenoxyacetic acid (2,4–D), 2,4-dichlorophenoxypropionic acid (2,4–DP), 2,4-dichlorophenoxybutyric acid, 2 - methyl - 4 - chlorophenoxyacetic acid (MCPA), 2 - methyl - 4 - chlorophenoxypropionic acid (Mecoprop), 2,4,5 - trichlorophenoxyacetic acid 2,4,5-trichlorophenoxypropionic acid.

The method of the invention for killing weeds particularly in cereal fields comprising contacting the weeds with a herbicidal amount of a composition comprised of at least two phenoxyalkanoic acid compounds selected from the group consisting of compounds of the formula

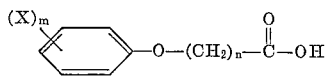

alkali metal and amine salts thereof, wherein X is at least one member of the group consisting of lower alkyl and halogen, $m$ and $n$ are integers from 1 to 3 and less than 5% of a compound selected from the group consisting of 4-amino-3,5,6 - trichloropicolinic acid, lower alkyl esters thereof and salts thereof. The amount of the herbicidal composition applied is usually sufficient to apply 10 to 40 grams, preferably 10 to 20 grams, per hectare of 4-amino - 3,5,6 - trichloropicolinic acid. At this dosage, excellent control of weeds is obtained without any effect on the cereal crops.

A preferred method of the invention for selectively killing weeds in cereal fields is applying a composition comprised of about 240 gm. of 2,4-dichlorophenoxyacetic acid, about 240 gm. of 2-methyl-4-chlorophenoxyacetic acid, about 1760 gm. of 2-methyl-4-chlorophenoxypropionic acid and about 20 gm. of the hydrochloride of 4-amino-3,5,6-trichloropicolinic acid per hectare. This method effectively destroys substantially all of the annual dicotyledons without causing any damage to the cereal crop.

In the following examples there are described several preferred embodiments to illustrate the invention. However, it should be understood that the invention is not intended to be limited to the specific embodiments.

In Table I are the compositions used in the following examples and the dosages are expressed in grams per hectare.

TABLE I

| Compositions | ATP | 2,4-D | MCPA | MECOPROP | 2,4-DP |
|---|---|---|---|---|---|
| I | 60 | 600 | | | |
| II | 60 | | 700 | | |
| III | 60 | 330 | 285 | | |
| IV | 10 | 240 | 240 | 1,760 | |
| V | 15 | 120 | 120 | 880 | |
| VI | 20 | 240 | 240 | 1,760 | |
| VII | 40 | 240 | 240 | 1,760 | |
| VIII | 60 | 240 | 240 | 1,760 | |
| IX | 60 | 360 | 240 | 1,000 | |
| X | 40 | | 500 | | 1,500 |
| XI [2] | | 240 | 240 | 1,760 | |
| XII [2] | | 120 | 120 | 880 | |

[1] and [2]: Standard compositions without ATP.

EXAMPLE I

The application of compositions IV, V, VI, VII, XI and XII was made in fields of wheat (var. Capelle) overrun by *Matricaria inodora* at the end of the tillering period. About 40 days later, observations on the state of the Matricaria were made and the results are indicated in Table II.

TABLE II.—RESULTS OBTAINED ON *MATRICARIA INODORA*

| | Test 1 | | Test 2 | |
|---|---|---|---|---|
| Compositions | Percent in reduction in lbs. | Percent in reduction in Nos. | Percent in reduction in lbs. | Percent in reduction in Nos. |
| IV | | | 98 | 93 |
| V | 100 | 100 | | |
| VI | | | 96 | 87 |
| VII | | | 100 | 100 |
| XI | | | 84 | 69 |
| XII | 18 | 60 | | |

The data in Table II clearly shows that four-component compositions V, VI and VII containing from 15 to 40 grams of 4-amino-3,5,6-trichloropicolinic acid give the best results while compositions XI and XII without 4-amino-3,5,6-trichloropicolinic acid give inferior results.

EXAMPLE II

The application of compositions II, VI and VII to barley (var. Rika) fields infested with *Chrysanthemum segetum* was made at the end of the tillering period. Forty days after the treatment, observations on the state of the Chrysanthemum were made and the results are given in Table III.

TABLE III.—RESULTS OBTAINED ON *CHRYSANTHEMUM SEGETUM*

| | Percent of reduction in— | |
|---|---|---|
| Compositions | Lbs. | Nos. |
| II | 75 | 81 |
| VI | 81 | 71 |
| VII | 92 | 93 |

The addition of 20 or 40 gm. of 4-amino-3,5,6-trichloropicolinic acid to the mixture of 2,4–D–MCPA–MECOPROP (Compositions VI and VII) allow obtention of results equal or superior to those obtained by adding 60 gm. of 4-amino-3,5,6-trichloropicolinic acid to MCPA alone (Composition II). Other tests made on the same weed have shown that all the compositions not containing 4-amino-3,5,6-trichloropicolinic acid were without activity on this species.

EXAMPLE III

The application of compositions I, II, III, IV, VI, VII, VIII, IX and XI was made in fields of wheat (var. Capelle) infested with *Polygonum aviculare* at the end of the tillering period. Thirty-five days after the treatment, observations establishing the percentages of destruction of the weed were made and the results are shown in Table IV.

TABLE IV.—RESULTS OBTAINED ON *POLYGONUM AVICULARE*

| | Test 1 | | Test 2 | |
|---|---|---|---|---|
| Compositions | Percent in reduction in lbs. | Percent in reduction in Nos. | Percent in reduction in lbs. | Percent in reduction in Nos. |
| I | | | 69 | 57 |
| II | | | 70 | 59 |
| III | | | 86 | 87 |
| IV | 93 | 75 | | |
| VI | 91 | 85 | | |
| VII | 100 | 100 | | |
| VIII | 100 | 100 | 93 | 90 |
| IX | | | 94 | 88 |
| XI | 71 | 55 | 72 | 44 |

Table IV shows that applications in which a minimum of 20 grams of 4-amino-3,5,6-trichloropicolinic acid were utilized in mixture with 2, 4–D, MCPA and MECOPROP gave superior results to those obtained with three-component compositions without 4-amino-3,5,6-trichloropicolinic acid (Composition XI) or with 2- or 3-component compositions containing 60 grams of 4-amino-3,5,6-trichloropicolinic acid (Compositions I, II and III).

EXAMPLE IV

Preparation of a spray solution

The following composition was prepared to be used at a dosage of 4 liters/hectare.

440 gm. of 2-methyl-4-chlorophenoxypropionic acid, 60 gms. of 2,4-dichlorophenoxy acetic acid and 60 gms. of 2-methyl-4-chlorophenoxyacetic acid were dissolved in 330 cc. of a 40% aqueous solution of dimethylamine. Then 3.3 gm. of 4-amino-3,5,6-trichloropicolinic acid were added to the aqueous solution in the form of potassium salt. Then 5 gm. of a complexing agent and sufficient water was added to make one liter of spray solution.

Various modifications of the compositions and method of the invention may be made without departing from the spirit or scope thereof and it is to be understood that the invention is to be limited only as defined in the appended claims.

I claim:

1. A method of selectively killing weeds in cereal crops which comprises applying to fields of cereal crops a composition comprised of about 240 grams of an amine salt of 2,4-dichlorophenoxy acetic acid, about 240 grams of an amine salt of 2-methyl-4-chlorophenoxy acetic acid, about 1760 grams of an amine salt of 2-methyl-4-chlorophenoxy-propionic acid and about 20 grams of an alkali metal salt of 4-amino-3,5,6-trichloropicolinic acid per hectare.

2. A method of selectively killing weeds in cereal crops which comprises applying to fields of cereal crops a composition comprising a mixture of an amine salt of 2,4-dichlorophenoxy acetic acid, an amine salt of 2-methyl-4-chlorophenoxyacetic acid, and an amine salt of 2-methyl-4-chlorophenoxy propionic acid and less than 5% based on the weight of said phenoxy alkanoic acids, of a picolinic compound selected from the group consisting of 4-amino-3,5,6-trichloropicolinic acid, lower alkyl esters thereof and alkali metal and amine salts thereof at a dosage of 10 to 40 gm. per hectare of said picolinic compound.

3. The method of claim 2 wherein the said composition is applied at a dosage of 10 to 20 grams per hectare of 4-amino-3,5,6-trichloropicolinic acid compound.

4. A synergistic herbicidal composition for the selective control of weeds in cereal crops comprising 12 parts by weight of an amine salt of 2,4-dichlorophenoxy acetic acid, about 12 parts by weight of an amine salt of 2-methyl-4-chlorophenoxy acetic acid, about 88 parts by weight of an amine salt of 2-methyl-4-chlorophenoxy propionic acid and about 1 part by weight of an alkali metal salt of 4-amino-3,5,6-trichloropicolinic acid.

5. A synergistic herbicidal composition for the selective control of weeds in cereal crops comprising a mixture of amine or alkali metal salts of 2,4-dichlorophenoxy acetic acid, 2-methyl-4-chlorophenoxy acetic acid and 2-methyl-4-chlorophenoxy propionic acid and less than 5%, based on the weight of the said phenoxy alkanoic acids of a picolinic acid compound selected from the group consisting of 4-amino-3,5,6-trichloropicolinic acid, its lower alkyl esters and alkali metal and amine salts thereof.

6. A composition of claim 5 wherein the picolinic acid compound is 4-amino-3,5,6-trichloropicolinic acid in the form of its potassium salt.

7. A method of selectively killing weeds in cereal crops which comprises applying to cereal crop fields a composition comprising a mixture of an amine salt of 2-methyl-4-chlorophenoxy acetic acid and an amine salt of 2-methyl-4-chlorophenoxy propionic acid and less than 5% based on the weight of said phenoxy alkanoic acids, of an alkali metal salt of 4-amino-3,5,6-trichloropicolinic acid at a dosage rate of 10 to 40 gm. per hectare of said picolinic acid.

References Cited

UNITED STATES PATENTS

| 3,151,970 | 10/1964 | Lush et al. |
| 3,285,925 | 11/1966 | Johnston et al. |

FOREIGN PATENTS

| 690,932 | 7/1964 | Canada. |
| 11,310 | 5/1968 | Japan. |

JAMES O. THOMAS, JR., Primary Examiner

U.S. Cl. X.R.

71—116, 117